US006899934B2

(12) United States Patent
Beyer

(10) Patent No.: US 6,899,934 B2
(45) Date of Patent: May 31, 2005

(54) MULTI-LAYERED RENEWABLE STICKY SURFACE BULLETIN BOARD

(75) Inventor: Martin D. Beyer, Acworth, GA (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/372,369

(22) Filed: Feb. 25, 2003

(65) Prior Publication Data

US 2004/0166272 A1 Aug. 26, 2004

(51) Int. Cl.[7] .................................................. B32B 7/12

(52) U.S. Cl. .......................... 428/40.1; 40/600; 40/615; 40/624; 40/657; 156/247; 156/272.6; 428/192; 428/194; 428/202; 428/21; 428/212; 428/214; 428/354

(58) Field of Search ................................ 428/40.1, 192, 428/194, 202, 211, 212, 214, 354, 201; 40/657, 600, 615, 624; 156/247, 272.6

(56) References Cited

U.S. PATENT DOCUMENTS

| | | | |
|---|---|---|---|
| 2,775,048 | A | 12/1956 | Berman |
| 2,914,873 | A | 12/1959 | Brennan |
| 3,501,797 | A | 3/1970 | Nappi |
| 3,503,835 | A | 3/1970 | Hermann |
| 3,620,891 | A | 11/1971 | Jones, Sr. et al. |
| 3,734,816 | A | 5/1973 | Swasey |
| 3,785,102 | A | 1/1974 | Amos |
| 3,952,133 | A | 4/1976 | Amos et al. |
| 4,301,205 | A | 11/1981 | Seltenheim et al. |
| 4,559,250 | A | 12/1985 | Paige |
| 4,605,246 | A | 8/1986 | Haas et al. |
| 4,767,119 | A | 8/1988 | Fadner et al. |
| 5,016,373 | A | 5/1991 | Theno |
| 5,342,665 | A | 8/1994 | Krawitz |
| 5,922,458 | A | 7/1999 | Herlihy |
| 6,263,602 | B1 | 7/2001 | Seiber et al. |
| 6,272,779 | B1 | 8/2001 | Seiber et al. |

FOREIGN PATENT DOCUMENTS

| | | | |
|---|---|---|---|
| EP | 989533 A1 * | 3/2000 | |
| GB | 1340636 | 12/1973 | |

* cited by examiner

*Primary Examiner*—Nasser Ahmad
(74) *Attorney, Agent, or Firm*—Schwartz & Weinrieb

(57) ABSTRACT

A new and improved bulletin board comprises a rigid support or backing member, and a tablet comprising a stacked array of adhesive-coated sheets, mounted upon the rigid support or backing member, wherein each one of the adhesive-coated sheets is adapted to have various different objects, such as, for example, notices, memos, notes, bills, pens, pencils, coupons, or the like, adhered thereon. By forming the bulletin board so as to comprise the plurality of adhesive-coated sheets, an exposed adhesive-coated sheet, whose tack level has degraded with time, may simply be removed from the tablet or stacked array of adhesive-coated sheets so as to expose a new or fresh adhesive-coated sheet which can now be used to again securely adhere objects upon the bulletin board.

18 Claims, 2 Drawing Sheets

MULTI-LAYERED RENEWABLE STICKY SURFACE BULLETIN BOARD

FIELD OF THE INVENTION

The present invention relates generally to bulletin boards, display panels, or other similar devices, and more particularly to a new and improved bulletin board, display panel, or similar device which is in the form of a tablet and comprises a stacked array of adhesive-coated layers or laminae wherein objects, such as, for example, notices, memos, notes, bills, pens, pencils, coupons, or the like are able to be automatically and readily secured upon the exposed or external surface of the outermost adhesive-coated layer or lamina of the stacked array of adhesive-coated layers or laminae without the need for using conventional mounting implements, such as, for example, thumb-tacks, push-pins, magnets, or the like, wherein further, when the outermost adhesive-coated layer or lamina of the stacked array of adhesive-coated layers or laminae has effectively lost its requisite degree of stickiness or tackiness so as to no longer be capable of adhesively retaining objects thereon, such outermost adhesive-coated layer or lamina may be readily removed so as to thereby uncover, expose, or reveal the next adhesive-coated layer or lamina within the stacked array of adhesive-coated layers or laminae of the bulletin board or display panel tablet such that a fresh or new adhesive-coated layer or lamina is ready to be used in connection with the mounting of the objects thereon, and wherein still further, each one of the adhesive-coated layers or laminae is capable of being written upon such that in addition to the objects being adhesively secured upon each one of the adhesive-coated layers or laminae, written messages may likewise be placed upon the bulletin board or display panel.

BACKGROUND OF THE INVENTION

Bulletin boards or display panels, which require the use of thumb-tacks, push-pins, magnets, or the like, in order to secure different objects to such bulletin boards or display panels, are of course well-known in the art. In addition, other types of bulletin boards or display panels are likewise known in the art which do not require the use of thumb-tacks, push-pins, magnets, or the like, in order to secure different objects to such bulletin boards or display panels. For example, as disclosed within FIG. 1, which corresponds substantially to FIG. 2 of U.S. Pat. No. 3,952,133 which issued to Amos et al. on Apr. 20, 1976, a pressure-sensitive bulletin board or display board is generally indicated by the reference character 10. The bulletin board or display board 10 is seen to comprise an adhesive layer 12 which is fixedly secured upon the front face of a support member or rigid base 14, and the support member or rigid base 14 is, in turn, adapted to be mounted upon a wall structure by means of hooks 16. As a result of the provision of the adhesive layer 12 upon the rigid base member 14, a plurality of different objects or items, such as, for example, papers 17, a note 18, keys 19, or a pen 20, may be readily secured to the bulletin board or display board 10 without the need for auxiliary mounting implements, such as, for example, thumb-tacks, push-pins, magnets, or the like. While the bulletin board or display board 10 of Amos et al. serves its purpose quite satisfactorily, bulletin boards or display boards exemplified by the Amos et al. bulletin board or display board exhibit a relatively limited or short service life cycle in view of the fact that extraneous dirt, lint, or other particles tend to accumulate upon the adhesive layer 12 of the bulletin board or display board 10 thereby necessitating periodic washing or cleaning of the same.

Another example of a bulletin board or display panel, which likewise does not require the use of auxiliary implements for mounting or securing various objects or items upon such bulletin board or display board, is disclosed within FIG. 2 which corresponds substantially to FIG. 3 of U.S. Pat. No. 5,016,373 which issued to Theno on May 21, 1991. More particularly, it is seen that the display device 10 of Theno is seen to comprise a support surface 11, for temporarily attaching signs or greeting cards 40,41 thereto, wherein the support surface 11 comprises a transparent pressure sensitive adhesive located upon one side of a sheet 16 which is adapted to be unrolled from a stored supply roll. The display device 10 is adapted to be mounted upon a wall structure by means of a string 13 which is suspended upon a nail 24 secured within the wall, the string 13 passing through end caps 19 disposed within a cylinder upon which the sheet 16 is disposed in its rolled supply format. The lower end of the display sheet 16 is secured within a rib member 15 within which a metal rod, not shown, is enveloped within an overlapped portion of the display sheet 16 so as to serve as a weighted member for maintaining the display sheet 16 in its unrolled suspended disposition relative to the supply roll. When the adhesive disposed upon the particular exposed section of the display sheet 16 becomes soiled or otherwise contaminated such that the adhesive no longer exhibits the requisite amount of stickiness or tackiness in order to securely retain the signs or greeting cards 40,41, an additional or fresh section of the display sheet 16 may be unrolled from the sheet supply roll, and the old used section of the display sheet may be severed and discarded.

In a manner similar to that of Amos et al., while the display device 10 of Theno similarly serves its purpose quite satisfactorily, display devices exemplified by the Theno display device likewise encompass undesirable operational disadvantages or drawbacks. In particular, for example, it is quite time consuming to provide the display device 10 with a new or fresh display surface 16 in view of the necessary replacement steps required. More particularly, the rib member 15 must firstly be disengaged from the lower end portion of the display sheet 16, the weighted metal rod must then be removed from the enveloping lower end portion of the display sheet 16, the old or used section of the display sheet 16 must then be severed, the weighted metal rod must then be reinserted within a new overlapping or enveloping portion of the new or fresh section of the display sheet 16, and the lower end portion of the new or fresh section of the display sheet 16, having the weighted metal rod enveloped therein, must then be reinserted within the rib member 15.

Still another type of bulletin board or display device which may be used for supporting relatively lightweight objects or items, such as, for example, notes, business cards, schedules, coupons, or the like, or even relatively heavier objects or items, such as, for example, keys, pens, pencils, or the like, is disclosed within FIG. 3, which substantially corresponds to FIG. 7 of U.S. Pat. No. 5,342,665 which issued to Krawitz on Aug. 30, 1994, and is generally indicated by the reference character 10. More particularly, the bulletin board of Krawitz is seen to comprise a support 11 having a front side or surface 12, and a plurality of adhesive strip assemblies 13 are provided upon the front surface 12 for retaining a plurality of items thereon. As can be appreciated, each one of the adhesive strip assemblies 13 comprises a set of adhesive film members 61–64, each of which has a pull end 80 operatively associated therewith. The adhesive strip assemblies 13 are separated from each other by means of spaces 50–54, and it is seen that the outermost film member 61 of each adhesive strip assembly 13 respectively has a protective tear strip or release sheet 40–45 disposed thereover for protecting the underlying adhesive surfaces until they are desired to be used for the item attachment purposes. As was the case with the bulletin or display boards of Amos et al. and Theno, while the bulletin board 10 of Krawitz is operationally satisfactory, the bulletin board 10 of Krawitz is specifically designed in its strip assembly form so as to intentionally vary the holding or retention power of the bulletin board 10, however, when the individual adhesive strips or film members 61–64 require replacement, it becomes somewhat tedious to necessarily individually replace or refresh all of the individual outermost adhesive film or strip members 61–64 of all of the individual adhesive strip assemblies 13 when, for example, the entire expanse of the front adhesive surface area of the bulletin board 10 is to be replaced such that the entire expanse of the front adhesive surface area of the bulletin board 10 is provided with a fresh adhesive, object-retaining surface.

A need therefore exists in the art for a new and improved bulletin board or display board wherein the adhesive surface, upon which the various objects are to be adhered, may be quickly and readily refreshed when desired so as to effectively maintain a viable or operative adhesive surface upon which various objects can be continuously adhered over a substantially long period of time.

OBJECTS OF THE INVENTION

Accordingly, it is an object of the present invention to provide a new and improved bulletin board or display board.

Another object of the present invention is to provide a new and improved bulletin board or display board that effectively overcomes the various operational drawbacks or disadvantages characteristic of PRIOR ART bulletin boards or display boards.

An additional object of the present invention is to provide a new and improved bulletin board or display board which effectively comprises a refreshable adhesive surface upon which objects can be adhesively secured.

A further object of the present invention is to provide a new and improved bulletin board or display board which effectively comprises a refreshable adhesive surface which can be readily and quickly refreshed.

A last object of the present invention is to provide a new and improved bulletin board or display board that effectively comprises a refreshable adhesive surface which can be readily and quickly refreshed such that objects can be adhesively secured upon the bulletin board or display board over a substantially long period of time.

SUMMARY OF THE INVENTION

The foregoing and other objectives are achieved in accordance with the teachings and principles of the present invention through the provision of a new and improved bulletin board or display board which comprises a rigid support or backing member, and a tablet comprising a stacked array of adhesive-coated sheets, mounted upon the rigid support or backing member, wherein each one of the adhesive-coated sheets is adapted to have various different objects, such as, for example, notices, memos, notes, bills, pens, pencils, coupons, or the like, adhered thereon. As each exposed adhesive-coated sheet will naturally tend to accumulate dust or other environmental particles thereon during its period of use, and in addition, as a result of the periodic adherence of the objects to the exposed adhesive-coated sheet, and the removal of the objects from the exposed adhesive-coated sheet, the degree of tackiness of the exposed adhesive-coated sheet will degrade as a function of time. In accordance with one of the primary unique and novel features of the present invention, when the degree of tackiness has in fact degraded to such an extent that the adhesive-coated sheet can no longer effectively retain the objects thereon, the exposed adhesive-coated sheet may simply be removed from the table or stacked array of adhesive-coated sheets so as to expose a new or fresh adhesive-coated sheet which can now be used to again securely adhere objects upon the bulletin board or display board.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 1:
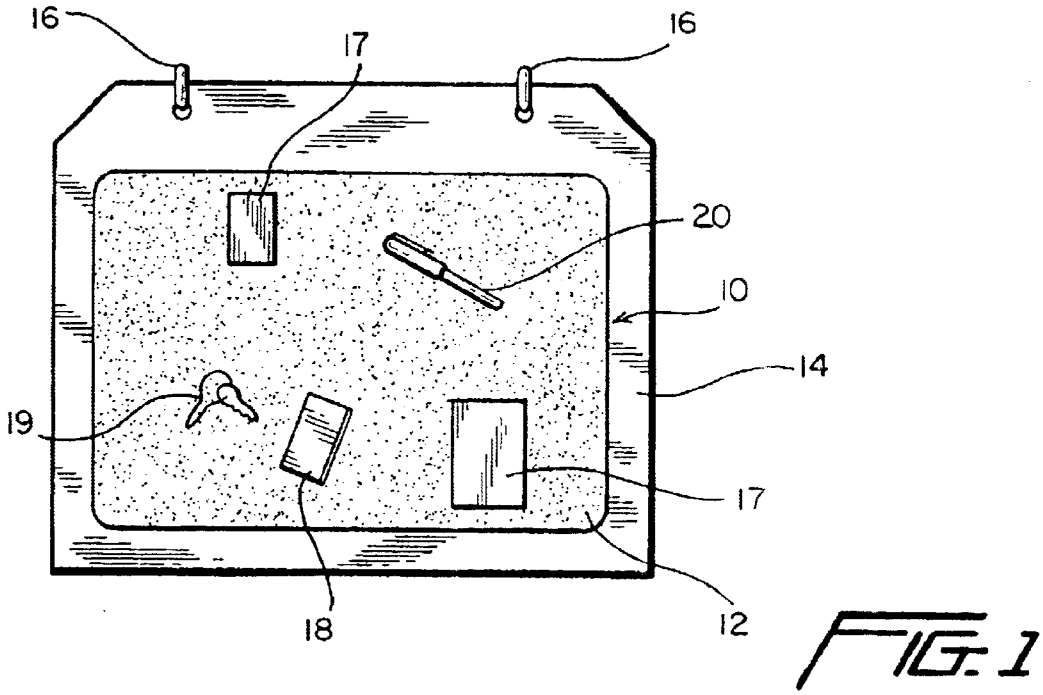
FIG. 1 (PRIOR ART)
FIG. 1 is a front elevational view of a first PRIOR ART pressure-sensitive display board having a single adhesive surface for adhering objects thereon.
Figure 2:
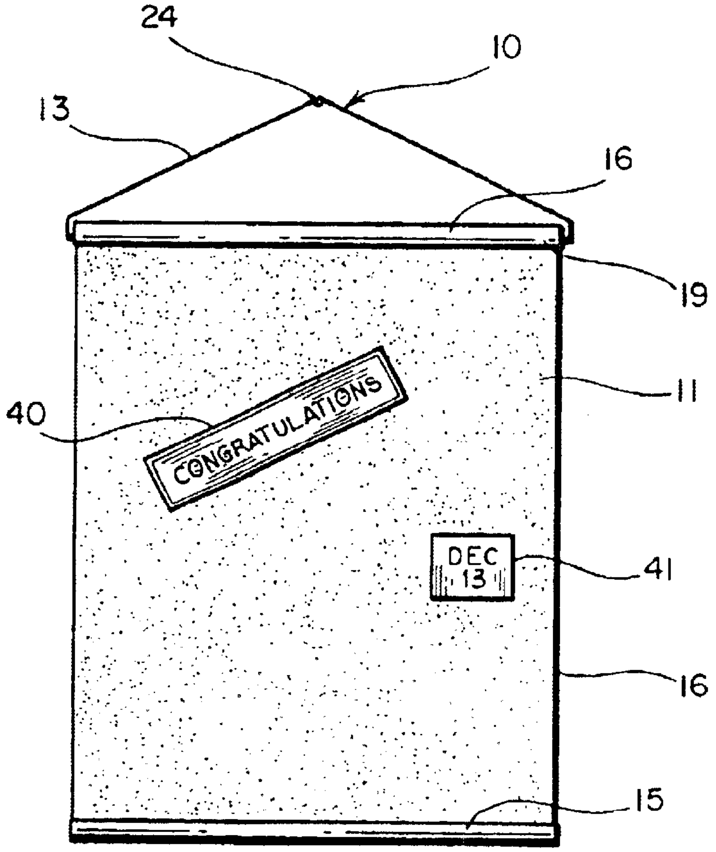
FIG. 2 (PRIOR ART)
FIG. 2 is a front elevational view of a second PRIOR ART display board having a single continuously refreshable adhesive surface for adhering objects thereon.
Figure 3:
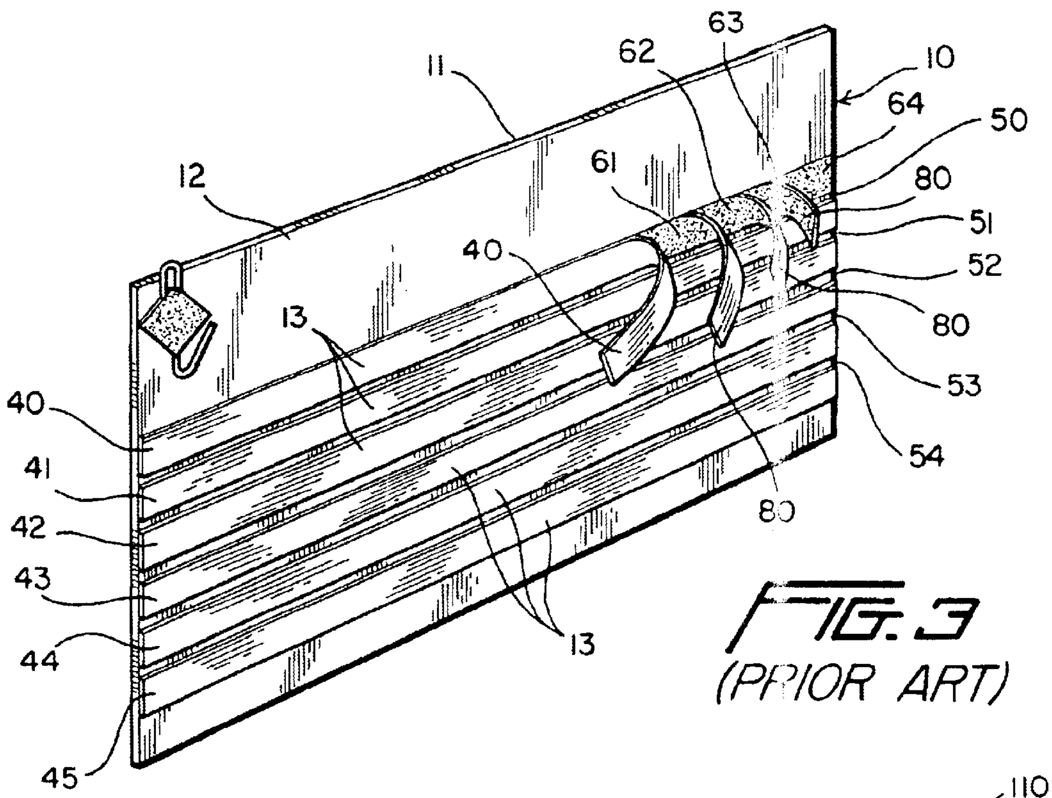
FIG. 3 (PRIOR ART)
FIG. 3 is a front elevational view of a third PRIOR ART display board having an adhesive surface comprising a plurality of adhesive strips for adhering objects thereon.
Figure 4:
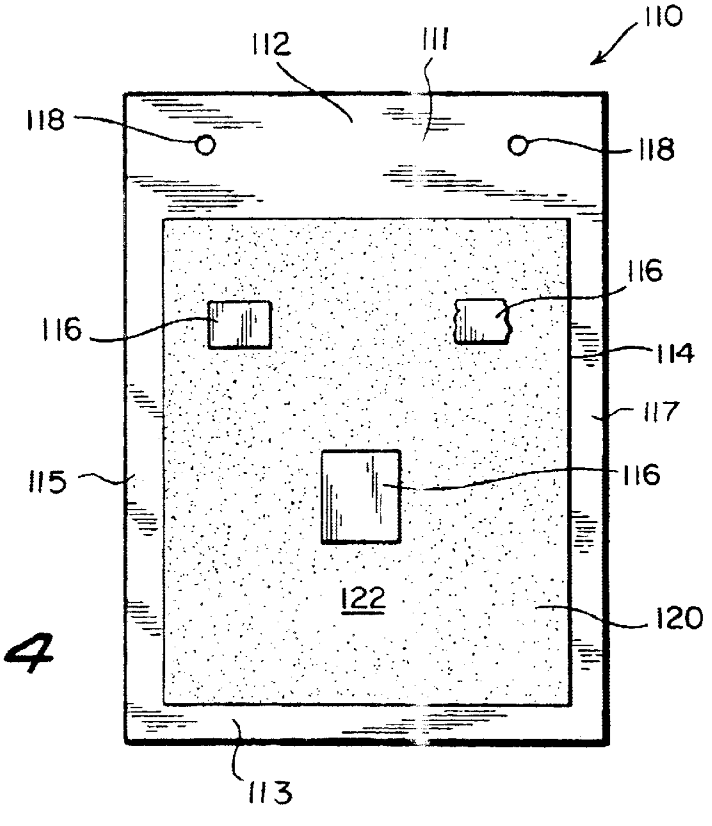
FIG. 4 is a front elevational view of a new and improved bulletin board constructed in accordance with the principles and teachings of the present invention and comprising a mutli-layered renewable stack of adhesive-coated sheets which may be successively removed so as to constantly provide a newly or freshly exposed adhesive surface, as desired or required, in order to securely adhere objects thereon.

Referring now to the drawings, and more particularly to FIG. 4 thereof, a new and improved multi-layered, renewable, adhesive-coated, exposed-surface bulletin board, constructed in accordance with the principles and teachings of the present invention, is disclosed and is generally indicated by the reference character 110. More particularly, the new and improved bulletin board 110 of the present invention is seen to comprise a rigid backing or support member 112, and a tablet, comprising a multi-layered stack or laminate of adhesive-coated sheets 114, upon which various objects, such as, for example, notices, memos, notes, bills, pens, pencils, coupons, or the like 116, are adapted to be adhered. It is seen that each one of the adhesive-coated sheets 114 is substantially the same size as that of the rigid backing or support member 112 except for the fact that, for example, predeterminedly sized marginal regions 111, 113, 115, and 117 are respectfully defined between the upper, lower, and opposite side edge portions of each one of the adhesive-coated sheets 114 and the corresponding upper, lower, and opposite side edge portions of the rigid support backing or support member 112. The upper marginal region 111 of the rigid backing or support member 112 may be provided, for example, with a plurality of apertures 118 such that the new and improved bulletin board 110 may be, for example, hung upon a vertical wall structure, however, it is of course to be noted that in lieu of the apertures 118, the new and improved bulletin board 110 may be provided with other means for suspendingly hanging or mounting the same upon the vertical wall structure.

In accordance with the primary feature characteristic of the unique and novel bulletin board 110 of the present invention, the multi-layered stack or laminate of adhesive-coated sheets 114 comprises a plurality of sheets 120 each of which is provided with an adhesive-coated surface 122 upon which the various objects, such as, for example, the notices, memos, notes, bills, pens, pencils, coupons, or the like 116, are adapted to be adhered. In connection with the actual fabrication of the multi-layered stack or laminate of adhesive-coated sheets 114, and of course, the multitude of individual sheets 120 having the adhesive-coated surfaces 122 respectively integrally formed thereon for securing the various notices, memos, notes, bills, pens, pencils, coupons, or the like 116 upon the bulletin board 110, the structure or make-up of the multi-layered stack or laminate of adhesive-coated sheets 114, and that of each one of the multitude of individual sheets 120, may be derived from or similar to the tack mat stack and individual sheets as disclosed within U.S. Pat. No. 4,559,250 which issued to Paige on Dec. 17, 1985.

More particularly, each one of the individual sheets 120, comprising the multi-layered stack or laminate of adhesive-coated sheets 114, may be fabricated, for example, from high-density polyethylene (HDPE), linear low-density polyethylene (LLDPE), or non-linear low-density polyethylene (LDPE). High-density polyethylene (HDPE) film typically has a film tensile strength of 4800 psi, ASTM test method D882, which is sufficient to withstand an adhesive pull load from an underlying film layer of ten ounces per lineal inch of width, while linear low-density polyethylene (LLDPE) film typically has a film tensile strength of 6000 psi which, again, is sufficient to withstand ten ounces of adhesion per inch of width without tearing, and non-linear low-density polyethylene (LDPE) film typically has a film tensile strength of 2800 psi. Each one of the sheets 120, comprising the multi-layered stack or laminate of adhesive-coated sheets 114, can have a thickness dimension which is within the range of 0.4 mil to 2.5 mils, and a thickness dimension of 1.0 mil is preferred. It is noted that if a film, having a thickness dimension of less than 1.0 mil, is to be used, the adhesive pull load must be accordingly reduced. For example, if a film having a thickness dimension of 0.4 mil is to be used, the adhesive pull load must be within the range of five ounces or less. It is also to be noted that it is more economical to use a relatively thin film in that plastic films are normally priced as a function of weight, such as, for example, per pound. Since a 1.0 mil film effectively yields three times the amount of working-surface area of film per pound as that of a 3.0 mil film, then a sheet of film, having a predetermined surface area, would be three times more expensive when produce as a film having a thickness dimension of 3.0 mils than a similar sheet of film having a thickness dimension of 1.0 mil.

In order to ensure that the adhesive material will strongly adhere to the surface of the polyethylene film, it is necessary to effectively distress the ordinarily smooth surface of the film. This distressing treatment of the film surface is accomplished by subjecting the film surface to a high electronic discharge which is commonly known as corona treatment. If the film surface is not in fact subjected to such corona treatment, the adhesive material would tend to rub off from the plastic film or to undesirably adhere and be transferred to the object that is desired to be secured to or mounted upon the bulletin board 110. Still further, while it is important to facilitate the separation of the individual sheets 120, comprising the multi-layered stack or laminate of adhesive-coated sheets 114, from each other when desired such that, for example, an old or used sheet 120 of the bulletin board 110 can be removed from the underlying multi-layered stack or laminate of adhesive-coated sheets 114 whereby a new or fresh sheet 120 of the underlying multi-layered stack or laminate of adhesive-coated sheets 114 of the bulletin board 110 can be exposed, it is also important to prevent premature delamination or separation of the individual sheets 120 of the multi-layered stack or laminate of adhesive-coated sheets 114 from each other so as not to adversely affect the continued use of the bulletin board 110 by permitting the individual sheets 120 of the multi-layered stack or laminate of adhesive-coated sheets 114 to be successively and individually exposed. Accordingly, the non-adhesive or uncoated side of each one of the sheets 120, comprising the multi-layered stack or laminate of adhesive-coated sheets 114, is likewise subjected to the aforenoted electronic or corona treatment, as a result of which, the non-adhesive or uncoated sides of the plastic sheets adhere more strongly to the underlying adhesive-coated sides or surfaces of the plastic sheets whereby the sheets 120 of the bulletin board 110 are held tightly together and effectively prevented from undergoing or exhibiting premature delamination.

Continuing still further, it is to be noted that the electronic corona treatment process results in a treatment level which effectively produces a force, which can of course be measured in dynes, by means of which the adhesive material is coated and bound upon the plastic film. A ten-dyne treatment level, or a twenty-dyne treatment level, is less disruptive to a plastic film surface than a forty-dyne treatment level, and accordingly, adhesive material which is coated upon a plastic film surface by means of a forty-dyne treatment level will be bound more tightly to the electronic corona-treated surface of the film than adhesive material which is coated upon the plastic film surface by means of a ten or twenty-dyne treatment level. Accordingly, still further, it is to be further appreciated that when adhesive material is coated onto a plastic film surface by means of a predetermined dyne treatment level, and when such adhesive-coated film surface is laminated to a plastic film surface which has not been coated with adhesive material but which also been subjected to an electronic corona treatment process at the same predetermined dyne treatment level, the adhesive material will adhere just as tightly to the non-coated corona-treated plastic film surface as it will adhere to plastic film surface upon which it has been originally coated. Therefore, it has been experienced that when both plastic film surfaces have been treated by means of, for example, forty-dyne treatment levels, the two film surfaces will not readily separate from each other with the films per se exhibiting tearing, or the adhesive material being partially delaminated from the film surface upon which it was originally coated.

Conversely, when both plastic film surfaces have been treated by means of, for example, ten or twenty-dyne treatment levels, the two film surfaces are able to be readily separated from each other without the films per se exhibiting tearing, or without the adhesive material being partially delaminated from the film surface upon which it was originally coated. Therefore, according to the principles and teachings of the present invention, the plastic film sheets can have adhesive material coated upon one side or surface thereof, the plastic film sheets 120 can be effectively adhered to each other, or held together, so as to form the multi-sheet or multi-layered stack or laminate of adhesive-coated sheets 114, and yet, the plastic film sheets 120 can be readily separated and released from each other as a result of properly controlling the electronic corona discharge treatment level. In connection with the proper control of the electronic corona discharge treatment levels to be impressed upon both the adhesive-coated and non-coated sides or surfaces of the film sheets 120, it is noted further that the two sides or surfaces of each film sheet 120 need not be treated with the same dyne treatment level. For example, the non-coated side or surface of each film sheet 120 may be subjected to a dyne treatment level which is approximately one half that of the dyne treatment level to which the adhesive-coated side or surface of each film sheet 120 is subjected. This relative treatment level relationship, as defined between the non-coated and adhesive-coated sides or surfaces of each film sheet 120, thus provides the necessary adherence of the individual film sheets 120, of the multi-sheet or multi-layered stack or laminate of adhesive-coated sheets 114, to each other while nevertheless permitting the individual film sheets 120, of the multi-sheet or multi-layered stack or laminate of adhesive-coated sheets 114, to be separated or released from each other when desired.

In accordance with such dyne treatment levels of both the non-coated and adhesive-coated sides or surfaces of the film sheets 120, it is also noted that the particular treatment level for a particular one of the sides or surfaces of the film sheets 120 may be varied, as may the relative proportion or ratio of the treatment levels for the opposite sides or surfaces of the film sheets 120, in order to in fact achieve the aforenoted optimum results. While optimum results may vary in connection with different plastic films, such as, for example, dependent upon the chemical composition of the plastic film per se, or the chemical composition of the particular adhesive and cross-linking materials, as well as the relative percentages by weight of the adhesive and cross-linking materials within the adhesive composition, being used upon the particular plastic film, it has been found that in order to achieve such optimum results for various plastic films, the adhesive-coated side or surface of each plastic film sheet 120 is preferably treated at an electronic corona discharge treatment level which is within the range of 40–50 dynes, while the non-coated side or surface of each plastic film sheet 120 is preferably treated at an electronic corona discharge treatment level which is within the range of 10–30 dynes. It is lastly noted that in accordance with the teachings and principles of the present invention, and in addition to the various objects, such as, for example, the notices, memos, notes, bills, pencils, pens, coupons, or the like 116 which are adapted to be adhered to the adhesive-coated side or surface of each film sheet 120 of the multi-sheet or multi-layered stack or laminate of adhesive-coated sheets 114, the exposed adhesive-coated surface of each film sheet 120 of the multi-sheet or multi-layered stack or laminate of adhesive-coated sheets 114 is also adapted to have memos, notes, or the like, written thereon wherein, if desired, the written memo, note, or the like, may be subsequently removed from the exposed adhesive-coated surface of the film sheet 120 by means of a suitable washing or cleansing process or treatment method.

Thus, it may be seen that in accordance with the principles and teachings of the present invention, there has been disclosed and described a new and improved bulletin board or display board which comprises a rigid support or backing member, and a tablet comprising a stacked array of adhesive-coated sheets, mounted upon the rigid support or backing member, wherein each one of the adhesive-coated sheets is adapted to have various different objects, such as, for example, notices, memos, notes, bills, pens, pencils, coupons, or the like, adhered thereon. As each exposed adhesive-coated sheet will naturally tend to accumulate dust or other environmental particles thereon during its period of use, and in addition, as a result of the periodic adherence of the objects to the exposed adhesive-coated sheet, and the removal of the objects from the exposed adhesive-coated sheet, the degree of tackiness of the exposed adhesive-coated sheet will degrade as a function of time.

Consequently, in accordance with one of the primary unique and novel features of the present invention, when the degree of tackiness has in fact degraded to such an extent that the adhesive-coated sheet can no longer effectively retain the objects thereon, the exposed adhesive-coated sheet may simply be removed from the tablet or stacked array of adhesive-coated sheets so as to expose a new or fresh adhesive-coated sheet which can now be used to again securely adhere objects upon the bulletin board or display board. The degree of adherence or tackiness level of the adhesive-coated surface of each film sheet may be variably adjusted as a result of different treatment levels by means of which the adhesive coating material is secured upon the film surface, as well as the particular chemical composition of the adhesive material per se, the chemical composition of the cross-linking constituents incorporated within the adhesive material, and the particular percentages by weight of the adhesive and cross-linking materials comprising the adhesive material composition.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A bulletin board upon which objects are to be secured for display, comprising:

a support backing having a first predetermined length dimension as defined between an upper edge portion of said support backing and a lower edge portion of said support backing, and a first predetermined width dimension as defined between opposite side edge portions of said support backing; and a tablet mounted upon said support backing and comprising a single stacked array of a plurality of sheets, wherein each one of said plurality of sheets is substantially the same size as said support backing, except for at least one marginal area defined between at least one edge portion of each one of said plurality of sheets and at least one of said upper, lower, and opposite side edge portions of said support backing, in that each one of said plurality of sheets has a second predetermined length dimension which is substantially the same as said first predetermined length dimension of said support backing such that an upper edge portion of each one of said plurality of sheets is disposed within the vicinity of said upper edge portion of said support backing while a lower edge portion of each one of said plurality of sheets is disposed within the vicinity of said lower edge portion of said support backing, and a second predetermined width dimension which is substantially the same as said first predetermined width dimension of said support backing such that opposite side edge portions of each one of said plurality of sheets are disposed within the vicinity of said opposite side edge portions of said support backing; and wherein further, each one of said plurality of sheets has adhesive material coated upon a first side thereof, a second side of each one of said plurality of sheets is non-coated, and said adhesive material is characterized by means of a predetermined tack level which is sufficiently strong such that objects can be adhered thereto, throughout the expanse of each one of said plurality of sheets as defined by said second predetermined length dimension and said second predetermined width dimension, so as to be displayed upon said bulletin board when the adhesive-coated side of an outermost one of said plurality of sheets is exposed, and yet said plurality of sheets can be individually separated from each other when a new sheet of said plurality of sheets is to be exposed so as to serve as a fresh outermost one of said plurality of sheets upon which objects are to be adhered for display upon said bulletin board.

2. The bulletin board as set forth in claim 1, wherein:

each one of said plurality of sheets is fabricated from a plastic material.

3. The bulletin board as set forth in claim 2, wherein:

said plastic material comprises high-density polyethylene (HDPE).

4. The bulletin board as set forth in claim 2, wherein:

said plastic material comprises linear low-density polyethylene (LLDPE).

5. The bulletin board as set forth in claim 2, wherein:

said plastic material comprises non-linear low-density polyethylene (LDPE).

6. The bulletin board as set forth in claim 1, wherein:

each one of said plurality of sheets has a thickness dimension which is within the range of 0.4–2.5 mils.

7. The bulletin board as set forth in claim 1, wherein:

said first adhesive-coated side of each one of said plurality of sheets, and said second non-coated side of each one of said plurality of sheets, are characterized by means of electronic corona discharge treatment levels, as measured in dynes, wherein said electronic corona discharge treatment level of said first adhesive-coated side of each one of said plurality of sheets is approximately twice said electronic corona discharge treatment level of said second non-coated side of each one of said plurality of sheets.

8. The bulletin board as set forth in claim 7, wherein:

said first adhesive-coated side of each one of said plurality of sheets is characterized by means of an electronic corona discharge treatment level which is within the range of 40–50 dynes, while said second non-coated side of each one of said plurality of sheets is characterized by means of an electronic corona discharge treatment level which is within the range of 10–30 dynes.

9. A method of making a bulletin board upon which objects are to be secured for display, comprising the steps of:

providing a support backing having a first predetermined length dimension as defined between an upper edge portion of said support backing and a lower edge portion of said support backing, and a first predetermined width dimension as defined between opposite side edge portions of said support backing; and mounting a tablet upon said support backing wherein said tablet comprises a single stacked array of a plurality of sheets, wherein each one of said plurality of sheets is substantially the same size as said support backing, except for at least one marginal area defined between at least one edge portion of each one of said plurality of sheets and at least one of said upper, lower, and opposite side edge portions of said support backing, in that each one of said plurality of sheets has a second predetermined length dimension which is substantially the same as said first predetermined length dimension of said support backing such that an upper edge portion of each one of said plurality of sheets is disposed within the vicinity of said upper edge portion of said support backing while a lower edge portion of each one of said plurality of sheets is disposed within the vicinity of said lower edge portion of said support backing, and a second predetermined width dimension which is substantially the same as said first predetermined width dimension of said support backing such that opposite side edge portions of each one of said plurality of sheets are disposed within the vicinity of said opposite side edge portions of said support backing; and wherein further, each one of said plurality of sheets has adhesive material coated upon a first side thereof, a second side of each one of said plurality of sheets is non-coated, and said adhesive material is characterized by means of a predetermined tack level which is sufficiently strong such that objects can be adhered thereto, throughout the expanse of each one of said plurality of sheets as defined by said second predetermined length dimension and said second predetermined width dimension, so as to be displayed upon said bulletin board when the adhesive-coated side of an outermost one of said plurality of sheets is exposed, and yet said plurality of sheets can be individually separated from each other when a new sheet of said plurality of sheets is to be exposed so as to serve as a fresh outermost one of said plurality of sheets upon which objects are to be adhered for display upon said bulletin board.

10. The method as set forth in claim 9, further comprising the step of:

fabricating each one of said plurality of sheets from a plastic material.

11. The method as set forth in claim 10, wherein:

said plastic material comprises high-density polyethylene (HDPE).

12. The method as set forth in claim 10, wherein:

said plastic material comprises linear low-density polyethylene (LLDPE).

13. The method as set forth in claim 10, wherein:

said plastic material comprises non-linear low-density polyethylene (LDPE).

14. The method as set forth in claim 9, further comprising the step of:

forming each one of said plurality of sheets so as to have a thickness dimension which is within the range of 0.4–2.5 mils.

15. The method as set forth in claim 9, further comprising the step of:

respectively treating said first adhesive-coated side of each one of said plurality of sheets, and said second non-coated side of each one of said plurality of sheets, with an electronic corona discharge treatment such that the electronic corona discharge treatment level of said first adhesive-coated side of each one of said plurality of sheets, as measured in dynes, is approximately twice the electronic corona discharge treatment level of said second non-coated side of each one of said plurality of sheets, as measured in dynes.

16. The method as set forth in claim 15, further comprising the steps of:

treating said first adhesive-coated side of each one of said plurality of sheets by means of said electronic corona discharge treatment such that said electronic corona discharge treatment level is within the range of 40–50 dynes; and treating said second non-coated side of each one of said plurality of sheets by means of said electronic corona discharge treatment such that said electronic corona discharge treatment level is within the range of 10–30 dynes.

17. The bulletin board as set forth in claim 1, wherein:

said at least one marginal area is defined between each one of said upper edge portions of said plurality of sheets and said upper edge portion of said support backing; and means are provided upon said at least one marginal area for facilitating the suspended display of said bulletin board.

18. The method as set forth in claim 9, further comprising the steps of:

defining said at least one marginal area between each one of said upper edge portions of said plurality of sheets and said upper edge portion of said support backing; and providing means upon said at least one marginal area for facilitating the suspended display of said bulletin board.

* * * * *